Nov. 24, 1931.　　　　R. PYZEL　　　　1,833,472
TREATMENT OF HYDROCARBON OILS
Filed April 27, 1928
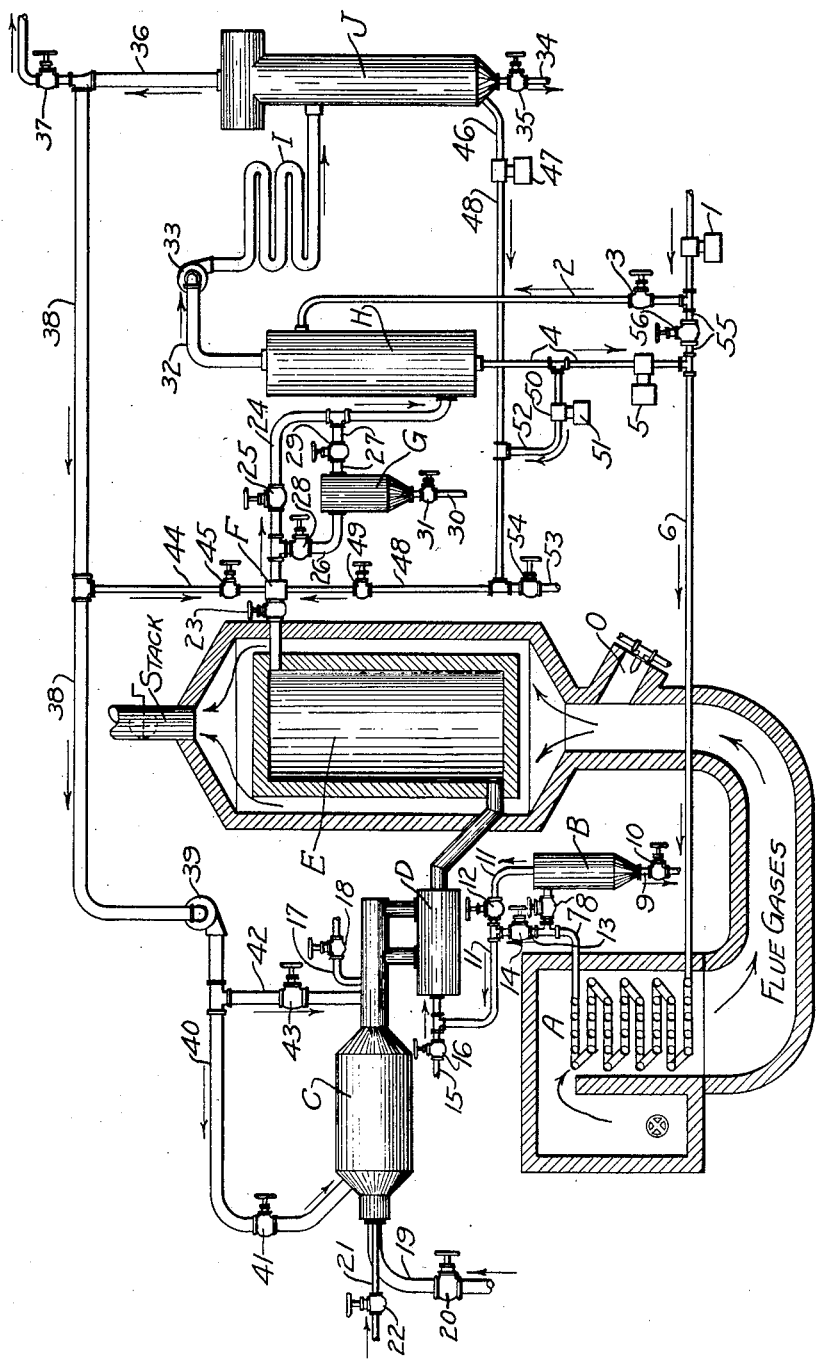
INVENTOR: Robert Pyzel
BY: Frank L. Belknap
ATTORNEY.

Patented Nov. 24, 1931

1,833,472

UNITED STATES PATENT OFFICE

ROBERT PYZEL, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

TREATMENT OF HYDROCARBON OILS

Application filed April 27, 1928. Serial No. 273,223.

My invention relates to the art of treating hydrocarbon oils to obtain therefrom, by means of high temperature conversion, any desired product susceptible of being formed therefrom.

In one specific embodiment, the invention comprises producing, by means of such conversion, a high quality motor fuel for use in internal combustion engines.

The process herein disclosed is essentially of the type wherein hydrocarbon vapors of relatively heavy character are heated to high temperatures, preferably exceeding 1000° F., by direct addition to said vapors of high temperature gaseous heating media, for instance, products of combustion, said vapors being then converted under the influence of such high temperature conditions to hydrocarbon vapors of lighter character, which are thereafter cooled, condensed and collected.

The essence of the invention concerns in particular, (1) the disclosure of special conditions and sequence under which the various steps comprising the present process are carried out, and (2) the disclosure of the physical requirements of the elements of apparati in which the process may be carried out.

In terms of these steps, or rather this series of interconnected steps, the process disclosed may be said to comprise the following: Heating the oil to be converted to cause vaporization of a large percentage thereof; separating the non-vaporous portion (and removing same from the process) and passing the vaporous portion on, with the addition of small quantities of steam or other material, if desired, to be mixed with high temperature combustion gases which have been independently obtained under conditions whereby the oxygen content of said gases is maintained at a negligible percentage; mixing said vapors with the combustion gases in such proportions that the resulting vapor-gas mixture will attain a temperature in excess of 1000° F., but not exceeding 1300° F., and causing the mixing to take place in a manner which will eliminate, insofar as possible, local and temporary overheating; then passing the mixture of hydrocarbon vapors and combustion gases, at a temperature in excess of 1000° F., through a time zone of such dimensions that a sufficient length of time will be required by the vapor-gas mixture in traversing such zone that the conversion of the vapors may proceed to the desired degree of completion, said time zone being characterized in that the radiation loss therefrom is substantially prevented; thereafter abruptly cooling the vapor-gas mixture to a lower temperature by direct addition of a suitable colder fluid; then separating any condensate which may have been formed as a result of said abrupt cooling and removing same; and thereafter passing the remaining vapor-gas plus cooling fluid mixture through a suitable final cooling and collecting zone, comprising heat exchanger, coolers, separators, absorbers, etc.

Initially, the material charged to the process may be passed through a number of heat exchangers whereby the heat contained in the efflux from the conversion zones of the process is imparted to the incoming raw material, thus effecting a considerable heat economy. The material to be treated, with its temperature considerably raised as a result of such heat exchange is then charged to and through one or more banks of tubes, serially connected, and located in suitable furnaces. While passing through said tubes the material is heated to temperatures of from 650 to 950° F., after which it is discharged into a separating zone. It is obvious that a certain amount of conversion of the material passing through the tubes may take place due to the temperature conditions attained therein. Such conversion, while it is not a requirement insofar as subsequent processing of the material is concerned, is by no means to be considered undesirable.

Upon entering the separating zone the efflux from the tubes, which at this stage will be in the form of an emulsion of vapors and liquid, will separate into a liquid and a vapor phase. The precise quality and proportion of material in each phase may be controlled by proper choice of pressure relative to temperature in this zone. The liquid phase will, of course, contain the heavier fraction of the efflux, and in the practice of my invention it is the specific purpose of the separating zone to separate as liquid phase all heavy constituents which it is undesirable to subject to further high temperature conditions because of the coking tendencies of such constituents at the higher temperatures. The liquid phase is removed from the separating zone and does not re-enter the process.

The vapors pass from the separating zone to the mixing zone. Small amounts of steam may be added to the vapors before entering the mixing zone, if desired. Any other materials may also be conveniently added to the vapors at this point, materials which, according to their nature, will either affect especially the rate and the equilibrium of the conversion reaction, or may more specifically affect the character and quality of the conversion products. (Such material may, however, also be added to the vapors indirectly by being injected into the combustion gases, which thereafter mix with the vapors.)

As stated, the temperature of the vapors entering the mixing zone is raised preferably by direct addition of high temperature combustion gases. The combustion gases used for this purpose are preferably inert, i. e., obtained under such conditions that practically no free oxygen will be present in their composition. It is, therefore, evident that substantially no other action will take place during the mixing of hydrocarbon vapors of a lower temperature with such combustion gases of higher temperature than a simple heat exchange.

It is obvious that, with proper operating conditions established in the mixing zone, the temperature and quantity of combustion gases added to the vapors will be of such value relative to the temperature and quantity of the vapors that the resulting mixture of vapors and gases will attain the desired temperature. This mixture then flows through the time zone for a determined length of time, that is, such length of time as may be required by the conversion reaction to proceed to the point desired.

In heating oil vapors by means of direct additions of hot gases, two items are of foremost importance. These are: the temperature of the gases when added to the vapors, and the manner in which the vapors and gases are brought together. It is self-evident that the higher the temperature of the gases when added to the vapors the smaller the quantity of gases needed to produce the desired high temperature of the vapor-gas mixture. Therefore, the higher the gas temperature, the greater the capacity of the apparatus, which is a very desirable condition. However, during the mixing of two fluids of different temperature some fractions of the colder material will temporarily attain temperatures higher than the ultimate temperature of the mixture, even as fractions of the hotter material will temporarily attain temperatures lower than the ultimate temperature of the mixture. In other words, during the mixing an uneven distribution of heat may temporarily occur within a temperature range limited by the temperature of the hotter material as a maximum and the temperature of the colder material as a minimum, until an equilibrium has been reached in the ultimate temperature of the mixture.

In the present case the vapors constitute the colder material, and the condition brought about in the fraction of time during which part of the vapors are heated to temperatures higher than the ultimate temperature of the mixture (when vapors and gases are brought in contact) is highly undesirable, since, during this temporary high temperature condition the fractions of vapors so heated will be converted to a further extent (at the higher temperature) than the main bulk of convertible material. It is to be particularly noted in this respect that with higher temperature conditions the cracking reaction not only proceeds at a much more rapid rate but also shifts towards the production of larger percentages of fixed gases. The subjection of any part of the hydrocarbon material which is being converted, even for a short fraction of time, to higher temperatures than the chosen operating temperatures may cause a decided increase in fixed gas production. To my knowledge this fact has not been sufficiently recognized in the oil conversion industry.

To minimize these undesirable high temperature conditions, the mixing zone must be of such design that the mixing takes place therein as rapidly and efficiently as possible, and the temperature of the gases entering the mixing zone to be combined with the vapors, should not be allowed to exceed a determined maximum. In determining this maximum it must be considered that, on the one hand, relatively low gas temperatures avoid excessive fixed gas formation, but reduce the capacity of the apparatus, while on the other hand, high temperatures of the gases increase the capacity of the apparatus, but cause excessive fixed gas formation. It follows that the most profitable temperature for the gases must be determined according to the relative value of efficiency of apparatus versus undesirability of fixed gas formation.

It has already been pointed out that the combustion gases added to the vapors in the mixing zone must be obtained under conditions that will warrant an extremely low oxygen content in their composition, the ideal condition being a complete lack of oxygen altogether. In the practice of the present invention the combustion gases are preferably obtained by burning, in an enclosed space, definite quantities of a hydrocarbon fuel (such as oil) and air, both injected into the combustion space under pressure. It is a familiar fact that, in burning a hydrocarbon fuel with a volume of air containing substantially no more than the requisite amount of oxygen to combine with all available fuel, the temperature at which the combustion products are formed will be considerably in excess of 3000° F. The temperature at which it is desirable to add the combustion gases to the vapors must not, as previously pointed out, exceed a determined maximum, and it may be said generally that this temperature should be within the limit of from approximately 1300 to 2400° F. In the present process the reduction of the high initial temperature of the combustion gases to temperatures within this range may be accomplished in several ways, but preferably it is accomplished by means of a recirculating system whereby part of the mixture of cold combustion gases and fixed hydrocarbon gases liberated at the collecting zones of the process may be added to the high temperature combustion gases previous to their entrance into the mixing zone. The cold gases may advantageously be introduced into the combustion zone at two points. They may be injected at a point where the actual combustion carried on in this zone has been completed, and in such case the cold gases will only mix with the hot combustion gases, thereby lowering the temperature while increasing the volume, or the cold gases may be injected into the combustion space near the burner end of said space, and in such case, by reducing the amount of fuel supplied to the burner without altering the quantity of the air supply, the lack of fuel thus created, and the thereby resulting relative excess of oxygen, will cause the oxidation of part or all of the fixed hydrocarbon gases entering the combustion space in admixture with the cold combustion gases, thereby substituting such hydrocarbon gases, which are a product of the process itself, in place of fuel obtained from an external source, while yet the cold combustion gases will lower the temperature of the newly formed, high temperature, combustion gases.

From the mixing zone the mixture of vapors and combustion gases passes through the time zone. The primary purpose of the time zone is to allow the conversion reaction to proceed for a determined length of time at substantially the temperature conditions established in the mixing zone. The primary requirements of the time zone therefore are (1) that it is of such volumetric capacity relative to the volume of material passing through that such material will traverse the zone in the period of time required for the conversion reaction to proceed to the point desired, and (2) that the radiation loss from this zone is substantially prevented.

In addition to these primary requirements it may be said that, as requirements of secondary importance, the time zone should be of such construction that dead spaces and eddying of the flow of material therein is prevented insofar as possible.

After passing through the time zone the mixture of combustion gases and hydrocarbon vapors is subjected to a very abrupt cooling immediately upon discharge from the time zone. The conditions necessitating this rapid cooling may be considered as follows. The material leaving the time zone is at a high cracking temperature. When entering a subsequent cooling zone and passing therethrough this material will be at cracking, although steadily decreasing, temperatures during the initial stage of its passage through said cooling zone.

Condensation of the heavier conversion products may take place in this initial stage of a cooling zone superseding the time zone, and the condensate may be detained in the initial stage of the cooling zone beyond a reasonable length of time (for instance, by settling against the tube walls if a tubular cooler is used) and, in consequence of the relatively high temperatures existing in this section of the cooling zone, such heavy condensate will then, in time, be reduced to coke. In this manner layer upon layer of coke may be deposited in the initial stage of the cooling zone. To prevent this undesirable deposition of coke it is necessary that lower temperature conditions be reached as rapidly as possible, or in other words, that the undesirable initial stage of high temperatures be traversed in a minimum of time.

In the practice of the present invention the abrupt cooling is preferably accomplished by injecting into the stream of vapors and gases discharging from the time zone a stream of a suitable colder fluid, in such proportions that the temperature is brought down thereby to below approximately 830° F., further cooling being then effected, if desired, by suitable heat exchanges with the incoming charge to the process. The fluid used for this purpose may be any suitable material, such as the liquid products of the process, steam, or the cooled combustion gases and fixed gases liberated from the collecting zones of the process.

The conversion of the material treated in the reaction zones of the process may yield in addition to the desired light materials, other products of heavy gravity and high boiling points. Part or all of these heavy products may condense due to the lowering of temperature by the abrupt cooling.

It is not desirable to subject these heavy products to further conversion conditions, and they must, therefore, be removed previous to subjecting the efflux from the reaction zones to a direct contact heat exchange with the fresh charge to the process, since with this type of heat exchange the heavier fractions of the efflux may be condensed and carried back through the process by the fresh charge of material. The following general outline is illustrative of the approximate conditions of the steps immediately succeeding the time zone.

The efflux discharged from the time zone, at a temperature of approximately 1000° F., or higher, is subjected to abrupt cooling by direct addition of a colder fluid, resulting in a lowering of temperature to approximately from 830° to 600° F., and further resulting in a condensation of fractions boiling above such temperature. These fractions are then removed by passing the mixture of vapor-gas-cooling fluid and condensate through a separator. The condensate is separated and removed, and the remaining material, that is, the vapor-gas-cooling fluid mixture, is passed preferably counter current to, and in direct contact with, the fresh charge to the system. An exchange of heat occurs whereby the temperature of the charge increases and the temperature of the vapor-gas-cooling fluid mixture decreases. A further condensation of the vapors (and possibly the cooling fluid) takes place as a result of the lowering of temperature, and the condensate thus formed returns to the heating zones of the process in admixture with the heated fresh charge.

The uncondensed vapors and the gases pass on to the final cooling and collecting zone of the process. The final cooling and collecting zone may consist of conventional coolers, separators, absorbers, et cetera, but I have found that a special apparatus, not heretofore used in the collection of the final products of an oil conversion process, must necessarily be employed in conjunction with the above named, more conventional, apparati, which together comprise the final cooling and collecting zone. I have found that when oil vapors are heated to high temperatures by direct addition of hot gases, such vapors will, when the vapor-gas mixture is cooled in subsequent zones of the process, condense to a very fine fog which cannot be separated easily from the gases in which it is suspended. To collect all the oil vapors in such case may require the use of special apparati, such as electrical precipitators, impact condensers, fog collectors, or et cetera.

It is thought that the principles underlying the present process have been clearly stated in the preceding specification, and that the function and physical requirements of the elements of apparati in which the process may be carried out have also been fully explained. For the purpose of a more complete understanding of the process disclosed I have appended to this specification a diagrammatic elevational view of apparatus in which the present process may be carried out. It is to be noted that the apparatus shown may undergo many structural changes without necessarily losing thereby its capacity of embodying the process disclosed in this specification.

Referring more in detail to the apparatus shown, the raw material to be converted may be drawn from any suitable source of supply or storage by pump 1 and charged through pipe 2, in which may be interposed a valve 3, to the heat exchanger H.

An exchange of heat between the efflux from the conversion zones of the process with the raw oil takes place in the heat exchanger H, and the heated material passes through pipe 4, through hot oil pump 5, and through pipe 6 to the heating zone A, comprising, in this instance, a bank of tubes positioned in a suitable furnace of conventional design. While passing through the tubes the material is heated to from 650 to 950° F. From the heating zone A the material passes through transfer pipe 7 and valve 8 to the separator B. The purpose of valve 8 is to enable an independent control of pressure in zone A and the separator B. A liquid-vapor separation takes place in the separator B, and the liquid phase is removed by means of pipe 9, in which is interposed a valve 10, and is not allowed to return to the process. The vapors pass from the separator B through pipe 11 and valve 12 to the mixing zone D. A by-pass 13, in which is interposed a valve 14, is provided between pipe 7 and pipe 11, by means of which the separator B may be cut out of the system if exceptionally light material is charged to the process.

Small amounts of steam or other materials may be added to the vapors previous to their entrance into the mixing zone by means of pipe 15 and controlled by valve 16. Such materials may, however, also be introduced into the system by means of pipe 17, controlled by valve 18.

In the mixing zone D the vapors are mixed with determined quantities of high temperature combustion gases which are obtained in the combustion zone C. Air is supplied, under pressure, to the combustion zone C by means of pipe 19 controlled by valve 20, and fuel, also under pressure, by means of pipe 21 controlled by valve 22.

After the mixing in zone D is completed the mixture of vapors and combustion gases passes through the time zone E. In the present instance the time zone consists of a cylindrical chamber, covered externally with a heat resisting material of good insulating quality, and mounted in a furnace setting. The flue gases from the heating zone A pass through this furnace setting before reaching the stack. In this manner the chamber is, in addition to being well insulated, surrounded by a high temperature atmosphere, whereby the radiation of heat from the chamber is substantially prevented. If desired, the temperature of the flue gases from the heating zone A may be raised by means of burner O, but at no time should it be necessary to raise the temperature of the flue gases surrounding the time zone higher than the temperature of the mixture of vapors and combustion gases entering the time zone from the mixing zone.

Upon discharge from the time zone E the vapor-gas mixture is cooled to a lower temperature by the additions of a colder fluid. This may take place at F, the colder fluid entering either by means of pipe 44, or by means of pipe 48. A valve 23 is provided in the conduit from the time zone E to the point F for the purpose of enabling a more complete control of pressure.

From F the material may pass directly to the heat exchanger H by means of pipe 24, in which is interposed a valve 25, or the material may be sent through the separator G by means of pipes 26 and 27, in which are interposed valves 28 and 29, respectively, and thence to the heat exchanger H. In the separator G any condensate which may have been formed as a result of the cooling at F is separated and removed through pipe 30 and valve 31.

The heat exchanger H may be either of the indirect or the direct contact type. The heat exchanger shown on the appended drawing is of the direct contact type. A heat exchanger of this type not only offers an opportunity for extremely efficient heat exchange, but in addition affords the possibility of returning any condensate which may be formed as a result of the cooling of the conversion products directly to the heating zone A in admixture with the fresh charge. Such condensate and heated fresh charge will pass from the heat exchanger H through pipe 4, pump 5, and pipe 6 to the heating zone A. The uncondensed vapors and the gases pass through pipe 32 and blower 33 and through the cooler I to the apparatus J, which preferably comprises an electrical precipitator of conventional design. It is to be understood that any efficient fog collector or other similar type of apparati may be used at this point in place of an electrical precipitator.

Final collection of all liquefiable material takes place here, and the collected liquid may be withdrawn through pipe 34 and valve 35. The uncondensable gases, comprising mostly the cooled combustion gases from the combustion zone C and the fixed hydrocarbon gases which are a product of the conversion, may pass out of the system through pipe 36 and valve 37. Part of these gases may, however, be circulated back to the combustion zone C by means of pipe 38 and blower 39, and thence either through pipe 40, controlled by valve 41, or through pipe 42, controlled by valve 43. Part of these gases may also be sent through pipe 38 and pipe 44 and through valve 45 to be mixed with the efflux from the time zone at F.

A large variety of material is suitable for being mixed with the efflux for cooling purposes at F, and to illustrate this I have shown on the drawing how (1) by means of pipe 46, pump 47 and pipe 48, in which is interposed a valve 49, the light liquid product of the process may be used, and how (2) by means of pipe 50, pump 51, pipe 52, and thence pipe 48 and valve 49, part of the charge to the heating zone A may be used, and how (3) by means of pipe 53, controlled by valve 54, and thence through pipe 48 and valve 49, any material from an external source, such as steam, may be used.

A by-pass 55, in which is interposed a valve 56, is provided between pipe 2 and pipe 6 by means of which the amount of fresh charge passing through the heat exchanger H may be limited without affecting thereby the total amount of material charged to the system.

While I do not wish to limit the process to any specific pressure conditions I nevertheless want to call attention to the possibility of operating the conversion zones of the process at pressures below atmospheric by means of suitably installed blowers or pumps, such as blower 33, while, on the other hand, these zones may be operated conveniently at superatmospheric pressures by means of pumps 1 and 5, and due to the forcing of air and fuel into the combustion zone C under pressure.

I claim as my invention:—

1. A hydrocarbon oil cracking process which comprises passing the oil in a restricted stream through a heating zone and heating the same therein to a temperature adequate to vaporize a substantial portion thereof, discharging the thus heated oil into a vapor separating zone and separating the same therein into vapors and unvaporized oil, removing the unvaporized oil from the separating zone and isolating the same from the process, separately removing the vapors from the separating zone and introducing the same to a mixing zone maintained free of liquid, simultaneously with the aforesaid operation independently generating combustion gases substantially devoid of oxygen and substantially chemical inert to the vapors by burning fuel in the presence of a volume of air containing substantially no more than the requisite amount of oxygen to combine with the fuel whereby the combustion gases are formed at a temperature considerably in excess of 3000° F., commingling with the thus generated combustion gases a sufficient quantity of a relatively cool gas to reduce the temperature of the combustion gases to between 1300° F. and 2400° F., then introducing the commingled gases, without prior heat exchange with oil undergoing treatment in the process, to said mixing zone and intimately commingling a sufficient quantity thereof with the vapors in the mixing zone to raise the vapors to a vapor phase cracking temperature, removing the resultant mixture of vapors and gases from the mixing zone and introducing the same to a reaction zone, substantially preventing heat losses by radiation from said reaction zone and reacting the vapors therein in the absence of liquid substantially entirely by the heat imparted thereto from the gases whereby no appreciable extraneous heat need be applied to the reaction zone, passing the mixture of vapors and gases through the reaction zone in continuous unobstructed movement while retaining the same therein for a time period adequate to convert a substantial quantity of the vapors into gasoline-like hydrocarbons by vapor phase cracking, removing the mixture from the reaction zone upon completion of said time period, and separating the gasoline-like hydrocarbons from the gases by condensation.

2. The method as defined in claim 1 further characterized in that said relatively cool gas comprises a portion of the gases from which said gasoline-like hydrocarbons have been separated by condensation.

In testimony whereof I affix my signature.

ROBERT PYZEL.